United States Patent
Alsalim

(10) Patent No.: US 11,693,994 B2
(45) Date of Patent: Jul. 4, 2023

(54) SYSTEM AND METHOD FOR SECURING CACHE BOARDS OF AN ENTERPRISE NETWORK DATA STORAGE SYSTEM

(71) Applicant: Saudi Arabian Oil Company, Dhahran (SA)

(72) Inventor: Ahmed Saad Alsalim, Dammam (SA)

(73) Assignee: SAUDI ARABIAN OIL COMPANY, Dhahran (SA)

(\*) Notice: Subject to any disclaimer, the term of this patent is extended or adjusted under 35 U.S.C. 154(b) by 119 days.

(21) Appl. No.: 17/243,801

(22) Filed: Apr. 29, 2021

(65) Prior Publication Data

US 2022/0350934 A1 Nov. 3, 2022

(51) Int. Cl.
*G06F 21/86* (2013.01)
*G07C 9/00* (2020.01)

(52) U.S. Cl.
CPC ......... *G06F 21/86* (2013.01); *G07C 9/00182* (2013.01)

(58) Field of Classification Search
CPC ..... G06F 21/86; G07F 21/87; G07C 9/00182; G07C 9/00174
See application file for complete search history.

(56) References Cited

U.S. PATENT DOCUMENTS

| | | | |
|---|---|---|---|
| 7,051,201 B2 | 5/2006 | Cuomo et al. | |
| 8,065,275 B2 | 11/2011 | Eriksen et al. | |
| 8,176,251 B2 | 5/2012 | Bali et al. | |
| 8,332,653 B2 | 12/2012 | Buer | |
| 8,769,226 B2 | 7/2014 | Wilk | |
| 9,960,912 B2 | 5/2018 | Lin et al. | |
| 10,115,256 B2 * | 10/2018 | Davis | H04L 63/0861 |
| 10,678,953 B1 | 6/2020 | Allo et al. | |
| 10,685,522 B2 * | 6/2020 | Malhotra | G07C 9/27 |
| 10,764,128 B2 * | 9/2020 | Kozura | H04W 12/069 |
| 10,997,251 B2 * | 5/2021 | Tran | G06Q 50/14 |

(Continued)

FOREIGN PATENT DOCUMENTS

WO 2019161285 A1 8/2019

OTHER PUBLICATIONS

No Author; Networked Storage Service Security Practices; University of Maryland; IT Service Desk; https://umd.service-now.com/itsupport/ltdesign@umd.edu?id=kb_article_view&sys_kb_id=bade81641b189894ef518738cd4bcb0dat_article_version=false; Nov. 29, 2020; 3 pages.

*Primary Examiner* — Hosuk Song
(74) *Attorney, Agent, or Firm* — Leason Ellis LLP

(57) ABSTRACT

A system and method for securing data storage devices in an information technology (IT) network storage system is provided. The security system comprises a security control computer and electronic locks, which are mounted in a data center cabinet to slots for holding respective data storage devices. The security protocol implemented by the control computer requires an authorized administrator to execute a lock/unlock command identifying a particular device, and to provide a first part of a combination key. Additionally, an on-site hardware engineer is required to input a second part of the key at a terminal on-site at the data center. Upon verification of the first key, and then the second key, the control computer unlocks or locks the appropriate electronic lock. The control computer also implements a data backup/flushing process prior to allowing removal of an online cache board to avoid data corruption, loss, or system interruption.

16 Claims, 3 Drawing Sheets

(56) References Cited

U.S. PATENT DOCUMENTS

| | | | |
|---|---|---|---|
| 11,227,454 B2 * | 1/2022 | Singh | G07C 9/00309 |
| 11,258,282 B2 * | 2/2022 | Baldasare | H02J 7/0013 |
| 11,423,723 B2 * | 8/2022 | Davis | G07C 9/00857 |

* cited by examiner

SYSTEM AND METHOD FOR SECURING CACHE BOARDS OF AN ENTERPRISE NETWORK DATA STORAGE SYSTEM

FIELD OF THE DISCLOSURE

The present disclosure is directed to physical and electronic access control systems and, more particularly to a security system and method for securing data storage hardware devices of an information technology network data storage system.

BACKGROUND OF THE DISCLOSURE

Information technology (IT) network computing systems, such as an enterprise network for a company or organization, are commonly hosted in data centers comprising hardware computing resources, such as servers, and various types of temporary and persistent data storage devices including cache boards.

Data centers are also sometimes shared resources on which multiple related or unrelated enterprise systems are hosted. Traditionally, any hardware engineer or technician who has physical access to the data center or other such designated location where enterprise storage systems are located can remove any hardware component from any storage systems, even if those systems are not actually being supported by the technician. This can result in service interruptions and data loss. Existing access-control solutions have significant shortcomings.

These and other considerations are addressed by the technology solution provided in this disclosure.

SUMMARY OF THE DISCLOSURE

According to an aspect of the present disclosure, there is provided a system for securing data storage devices in an information technology (IT) network storage system, which includes a plurality of data storage devices mounted in slots in a cabinet and being in data communication with a computing device of the IT network. The system for securing storage devices comprises electronic locks and a security controller computing device. Each electronic lock is mounted in the cabinet in physical relation to a respective slot among the slots and is configured to be transitioned between a locked state and an unlocked state. In the locked state an electronic lock physically prevents insertion or removal of a data storage device from a respective slot and, in the unlocked state, the electronic lock allows insertion or removal of the data storage device from the respective slot.

The security controller computing device includes a processor, a communication interface, a non-transitory computer readable storage medium, and one or more software modules that are stored in the storage medium and that are executable by the processor. Additionally, the processor is in data communication with the electronic locks.

The software modules include a software-key generation module that configures the processor to generate one or more keys including a first key that is provisioned for an administrator of the IT network storage system and a second key that is provisioned for an engineer of the IT network storage system.

The software modules further comprise a communication module that configures the processor to be in data communication with the electronic locks, the computing device of the IT network storage system, an on-site computing terminal at the location of the cabinet that is useable by the engineer, and an administrator computing terminal that is useable by the administrator. The communication module configures the processor to receive a command input via the administrator computing terminal. In particular, the command includes an identification of a particular data storage device among the data storage devices and is accompanied by the first key. Moreover, the command comprises one or more of a lock command or an unlock command.

The software modules also include an authorization module that configures the processor to, in response to receiving the command and the first key, verify the first key. The software modules also include a cache management software module that configures the processor to, in response to the unlock command and verification of the first key, initiate a software-based unlocking operation on the particular data storage device.

Additionally, the communication module further configures the processor to receive the second key from the on-site terminal and the authorization module further configures the processor to, verify the second key in regard to the first key. The processor is further configured to, after completion of the software-based unlocking operation on the particular data storage device and verification of the second key, transition a particular electronic lock that is mounted to the cabinet and corresponds to the particular data storage device to the unlocked state.

According to a further aspect, a computer implemented method is provided for securing data storage devices in an information technology (IT) network storage system, which includes a plurality of data storage devices mounted in slots in a cabinet and being in data communication with a computing device of the IT network.

More specifically, the method comprises the step of providing electronic locks. Each electronic lock is mounted in the cabinet in physical relation to a respective slot among the slots and is configured to be transitioned between a locked state and an unlocked state. In the locked state an electronic lock physically prevents insertion or removal of a data storage device from a respective slot and, in the unlocked state, the electronic lock allows insertion or removal of the data storage device from the respective slot.

The method also includes the step of generating, with a processor of a controller computing device, one or more software-based keys including a first key that is provisioned for an administrator of the IT network storage system and a second key that is provisioned for an engineer of the IT network storage system. In particular, the processor is executing program code that is in the form of one or more software modules stored in a non-transitory storage medium. Additionally, the processor is in data communication with the electronic locks, the computing device of the IT network storage system, an on-site computing terminal at the location of the cabinet that is useable by the engineer, and an administrator computing terminal that is useable by the administrator.

The method further includes the step of receiving, by the processor, a command input via the administrator computing terminal. The command includes an identification of a particular data storage device among the data storage devices and is accompanied by the first key. Additionally, the command comprises one or more of a lock command or an unlock command.

The method also includes the steps of verifying, by the processor in response to receiving the command and the first key, the first key. Then, in response to the unlock command and verification of the first key, the processor initiates a software-based unlocking operation on the particular data storage device.

The method further comprises the steps of receiving, by the processor, the second key from the on-site terminal and verifying the second key in regard to the first key. Furthermore, in response to completion of the software-based unlocking operation on the particular data storage device and verification of the second key, the method includes the step of transitioning a particular electronic lock among the electronic locks that is mounted to the cabinet and corresponds to the particular data storage device to the unlocked state.

These and other aspects, features, and advantages can be appreciated from the accompanying description of certain embodiments of the disclosure and the accompanying drawing figures and claims.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DESCRIPTION OF CERTAIN EMBODIMENTS OF THE DISCLOSURE

Figure 1:
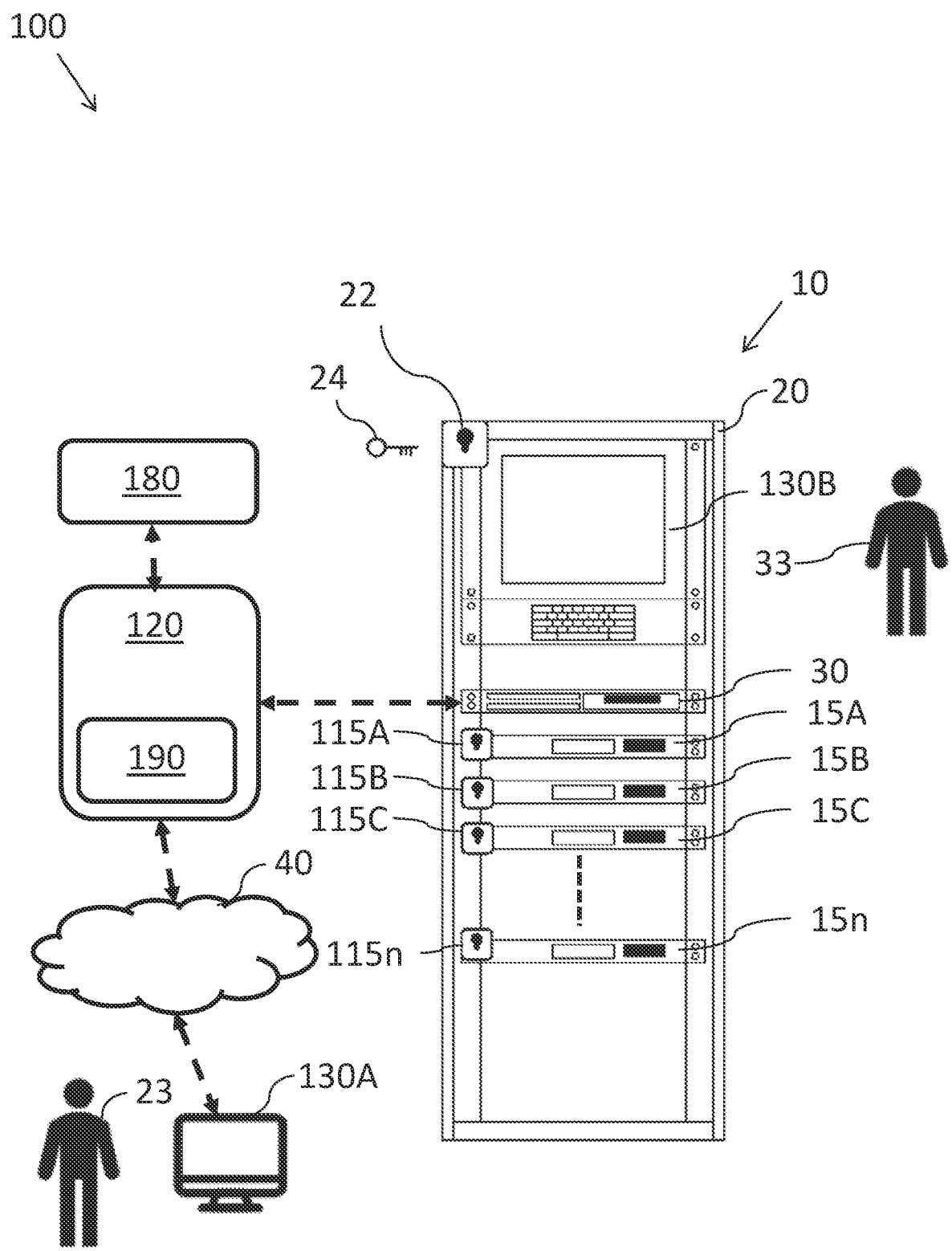
FIG. 1 is a block diagram of an exemplary system for securing data storage devices of an IT network data storage system, according to an embodiment.

By way of overview and introduction, embodiments of the systems and methods disclosed herein generally concern aspects of a security system for securing data storage devices of an IT network storage system. As a non-limiting example, the security systems and methods of the present disclosure are described herein as being directed to securing cache boards of an enterprise network data storage system. It should be understood, however, that the embodiments are similarly useable for various types of data storage hardware components and for various other types of IT network storage systems.

Traditionally, any hardware engineer or technician who has physical access to a data center where enterprise storage systems are located can remove any hardware part from any storage systems, even those systems that are not actually being supported by the technician. While most storage systems in the market have physical lock on the cabinet/module that can be unlocked by a hardware engineer who has the physical key, physical keys can be copied. Additionally, because a hardware engineer in a shared data center might have access to systems for multiple enterprises, keys are not sufficiently secure. Furthermore, a sudden removal of storage cache board without proper preparation might corrupt storage data because there is still ongoing data flow and because data has not been flushed to permanent storage hard disks. The security systems and methods of the present disclosure address these and other drawbacks of existing computer network storage security systems.

The security systems and methods of the present disclosure can, in some embodiments, continue to leverage the physical key and lock system for accessing a cabinet of an enterprise storage system. Additionally, the security systems and methods of the present disclosure can, in some embodiments, implement a software-based security protocol using two-factor authentication and combination keys to ensure only authorized persons are allowed to physically remove or disconnect storage hardware from the enterprise storage system. Accordingly, the security systems and methods of the present disclosure can provide a security solution in which physical and software-based keys are required to lock or unlock a given hardware components.

In an embodiment, the security protocol requires an authorized storage administrator to first execute a storage command identifying a particular cache board of the storage system, and to provide a first part of a complex combination key. The key can be configured initially during setup of a storage system using, for example, a key generator. The key can also be provisioned by using a complex key generator on-demand (e.g., as required by maintenance). Also, the protocol further requires the on-site hardware engineer to insert a second part of the key to unlock the targeted cache board. This helps to reduce human mistakes from removing a healthy cache board or its components such as slots, or memory.

In accordance with a salient aspect of one or more embodiments according to the disclosure, including the illustrated embodiments, the security solution also implements a key-based data backup/flushing process, prior to allowing removal, to ensure proper removal of a cache board or its component from the enterprise storage system with no data corruption or data loss, and with no system interruption by maintaining the consistency of throughput.

FIG. 1 is a block diagram of an exemplary system 100 for securing data storage components of an enterprise network data storage system 10, according to an embodiment. Enterprise storage system 10 can comprise multiple hardware storage components, including, for example and without limitation cache boards 15A-15n, which are physically mounted in a cabinet 20 and in data communication with the enterprise storage system by respective connectors (not shown). The cabinet 20 can include a physical lock 22 that is configured to be manually locked/unlocked using a physical key 24 such that, when unlocked, the components within the cabinet are accessible.

The system 100 further comprises a networked security system 110, which is in data communication with one or more components of the enterprise storage system 10. In an embodiment, the security system 110 comprises a control computing device 120 configured to communicate with a computing device of the enterprise storage system. The control computing device is also in communication with one or more local and remote computer terminals. In an embodiment, an administrator 23 at a local or remote computer terminal 130A can log-into the computing device 120, submit commands and a security key from the remote terminal 130A. An on-site computer terminal 130B is provided such that the hardware engineer 33 on-site at the storage system 10 can input the engineer's security key and otherwise interact with the security system 110.

The security system 110 further comprises a database 180 in communication with the control computer 120 and optionally the data storage system 10. The database can contain and/or maintain various data items and elements that are utilized throughout the various operations of the system including security keys and passwords, user information and permissions, storage system parameters, and other such information relating to operation of the systems and methods of the present disclosure.

The security system 110 further comprises one or more complex key generators 190. In an embodiment, the complex key generator(s) 190 is implemented using the control computing device 120. However, the complex key generator can similarly be separate from and in communication with the control computing device 120, among other elements of the system 100 including the database 180. The complex key generator can include a symmetric-key generator, a public-key generator, a random key generator, or any computer resource that can generate a unique sequence of pseudo-random characteristics. In an embodiment, one or more complex key generators can be arranged to generate a complex combination key, or portions thereof in a centralized or distributed fashion. For instance, a complex key generator can be provided at the control computing device. In addition or alternatively, each of the administrator 23 and engineer 33 can be provided a complex key generator, such as a security token, configured to generate a respective part of the complex combination security key/password for verification by the control computing device 120.

Additionally, the security system 110 further comprises one or more electronically controlled locking devices 115A-115n. In an embodiment, the electronically controlled locks can be mounted to the cabinet 20 in relation to respective slots within which respective cache boards can be mounted. The locks can be configured to be transitioned between a locked and unlocked state. When in the locked state a given lock (e.g., lock 115A) is configured to physically prevent a respective cache board (e.g., cache board 15A) or components of the cache board from being removed from the corresponding slot in the cabinet or otherwise disconnected. When in the unlocked state a given lock (e.g., lock 115A) allows the respective cache board to be physically removed from the cabinet 20. Additionally, because the locks are associated with respective slots in the cabinet 20 they are thus configured to prevent/or allow a user from inserting or otherwise connecting devices into empty cache board slots.

As further described herein, the control computer 120 is configured to implement the security protocols for authorizing the removal of an online cache board, or insertion of a cache board, based on the software commands received from the administrator and a combination of keys input by the administrator and the hardware engineer, respectively. In an embodiment, the security system unlocks a particular hardware part to allow authorized removal from the enterprise storage system upon matching the key input by the storage administrator with the key input by the hardware engineer.

In an embodiment in accordance with one aspect of the present disclosure, the control computer 120 is also configured to coordinate the backup or flushing of data from a particular cache board in response to administrator's software command to release the particular cache board and verification of an administrator's key or password. In such an embodiment, the backup or flushing occurs prior to the unlocking of the cache board to ensure that such operation is performed before the engineer attempts cache board removal. In particular, the backup or flushing operation is performed and completed and, upon completion of that task, then the unlock signal is issued, as further described below in connection with the exemplary method.

Figure 2:
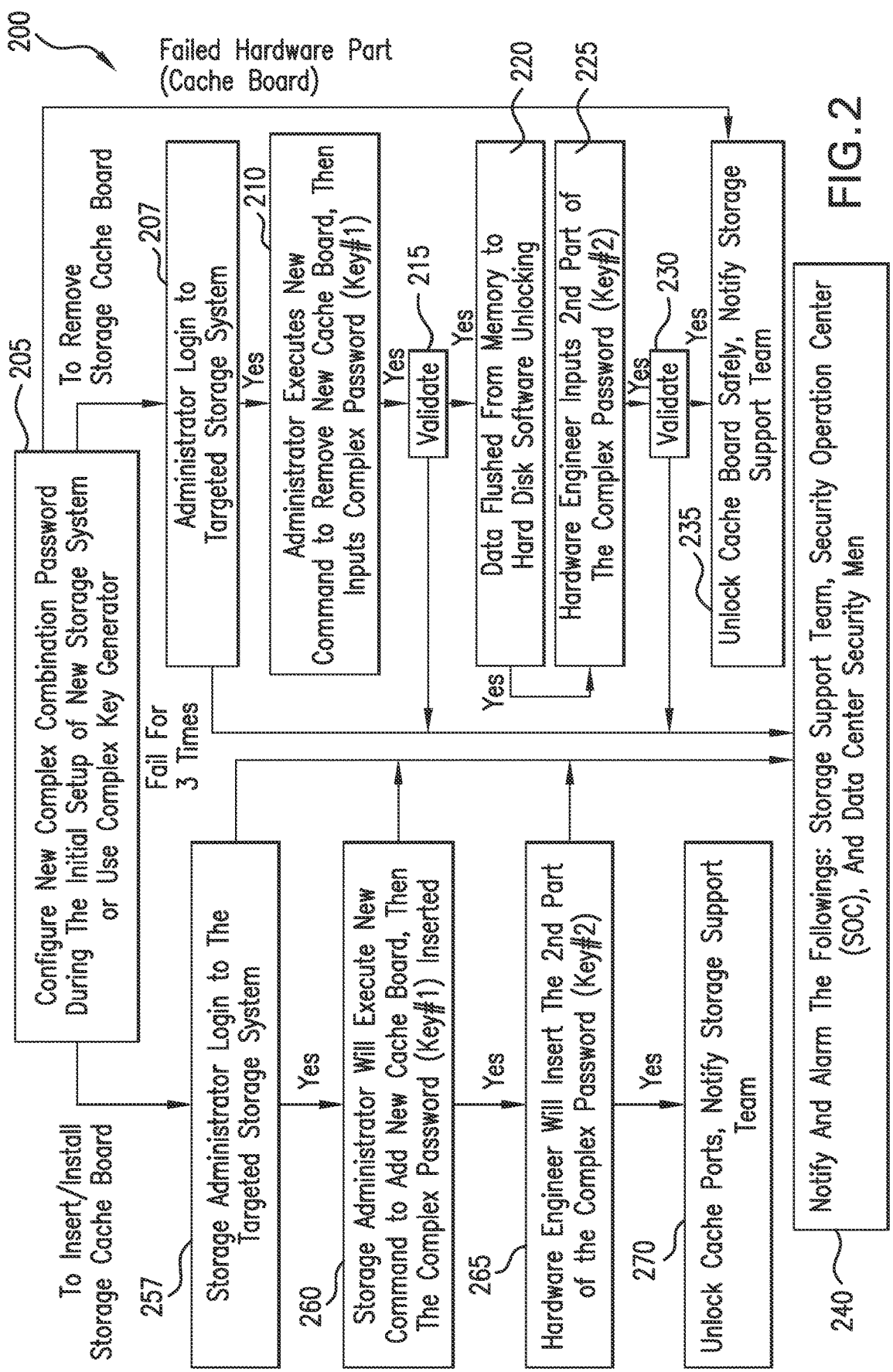
FIG. 2 is a flowchart of a method for securing data storage devices of an IT network data storage system using the system of FIG. 1, according to an embodiment.

FIG. 2 is an exemplary method 200 for securing data storage devices of an IT network storage system using the system 100 of FIG. 1 according to an embodiment.

At step 205, the control computer 120 generates a complex combination keys/passwords ("key1" & "key2"). In an embodiment, the combination keys can be automatically generated by the networked security system 110, particularly the control computing device 120, during the initial configuration and setup of the system 100 using a complex key generator running, for example, a symmetric-key algorithm or a public-key algorithm. The use of a complex key, with two parts being respectively used from both the storage administrator, and the hardware engineer, to form a single complex password ensures that there is coordination among these entities.

To remove online and production cache board during the maintenance, upgrade, or replacement of one component within the board while still there is data flow (throughput) without causing unexpected data corruption or data loss, the following steps of routine 200 can be performed.

At step 207, the control computer 120 identifies and authorizes the administrator. For instance, the storage administrator using remote terminal 130A can be required to log-into the control computing device 120 using a username/password or any suitably secure user authentication system.

At step 210, the control computer 120 receives a command executed by the authorized administrator in regard to an identified cache board or a particular unoccupied slot. The command can, for example, request to release the identified cache board, say, cache board 15A. The command can also expressly or implicitly instruct (i.e., automatically require) additional operations, including, to suspend read & write operations to the identified cache board, and to flush its data as a pre-step to the ultimate command of physically releasing the board for removal. Additionally, at step 210, the control computer 120 can be configured to prompt the administrator to input the first part of the complex key (i.e., key1).

At step 215, the control computer 120 verifies key1. For example, the control computer can compare the received key1 to a database of keys associated with respective authorized administrators for a match. In addition or alternatively, the key1 can be verified against a database of keys associated with one or more of the system 10 and the identified cache board 15A. Additionally, at step 215, the control computer 120 can validate the received command and the key1 to ensure that privileges associated with the key and/or the administrator include implementing the command in regard to the identified cache board. For example, the control computer can cross-reference the command and associated cache board against a stored set of privileges associated with one or more of the authorized administrator and the key.

At step 220, based on the verification of key1 at step 215, the control computer 120 initiates any pre-steps to release of the identified cache board, including, for example and without limitation, the flushing of data in the particular cache board being removed to storage hard disks (not shown). This is referred to as software-related locking/unlocking. In an embodiment, the control computer 120 generates and sends a command to the computing device 30, which controls operation of the enterprise storage system 10, identifying the particular cache board being removed (e.g., board 15A), and instructing the computing device 30 to flush the data in the cache to persistent data storage. The command can further cause the computing device 30 to take any additional actions necessary to ensure safe removal without service interruptions. For example, the command can direct the computing device 30 to suspend/stop any new read or write (I/O ops) to the cache and redistribute the data flow among other healthy online cache boards.

Then at step 225, the control computing device 120 receives a second part of a software key ("key2"), which can also be a combination key. More specifically, in an embodiment, in response to completion of step 220, the control computing device 120 can be configured to send a prompt to the on-site terminal 130A requesting that the hardware engineer input the second part of the combination key (i.e. key2) into terminal 130A. In some embodiments, the control computing device 120 can be further configured to cause the storage system 10 to indicate which of the cache boards has been software locked/unlocked. For example, an indicator light on the cache board 15A can be illuminated to identify it. Similarly, an indicator light on an associated lock 115A can be illuminated to identify the slot in which a board is to be inserted or removed.

Then at step 230, the control computing device 120 verifies the received second key, key2. For instance, in an embodiment, key2 is matched against the first part of the software key received from the administrator, key1.

At step 235, as a result of a match at step 230 and completion of the software-based unlocking at step 220, the control computing device 120 can be configured to physically unlock the cache board 15A. More specifically, in an embodiment, the control computing device 120 can generate and transmit a control signal to the electronic lock 115A, which is associated with the particular slot of cache board 15A, causing it to unlock and thereby allowing the engineer to physically remove the cache board. Accessing the physical cache board can also be contingent on the engineer using a physical key 24 to unlock the lock 22 of cabinet 20, which provides access to the internal components of the cabinet 20. Additionally, at step 235, the control computing device 120 can be configured to send an electronic message to a computer terminal or electronic address of the storage system management or monitoring teams, wherein the message indicates that the cache board has been disabled and the part has been removed successfully by authorized persons.

Furthermore, at step 240, the control computing device 120 can be configured to generate an alert in response to unauthorized attempts to perform any operation on the system 10. For instance, if a storage administrator or hardware engineer fail to insert the correct key to unlock a storage part three times, the control computing device can be configured to log the event and send an electronic notification to, for example, the storage management or monitoring team or datacenter security personnel for further investigation.

In addition to securing and controlling the removal of cache boards from the enterprise storage system 10, the control computing device 120 can be configured to securely coordinate the installation of data storage devices or components back into the system 10 by implementing steps 257-270, which are described next and which are similar in principle to steps 207-235 discussed above. By default, and during the installation of new cache board or replacement of one component within a healthy cache board, the control computing device 120 can be configured to lock all unused physical cache ports (e.g., locks 115A-115n). At step 257, the storage administrator logs into the control computing device 120, as discussed in connection with step 207. At step 260, similar to steps 210-220, the storage administrator executes a new command to add a new cache board and inserts the complex key1 for validation. At step 265, similar to step 225-230, the hardware engineer inserts the second part of the complex key, key2. Provided combination keys (key1 & key2) are inserted by both storage administrator (key1) and hardware engineer (key2), the cache port(s) are unlocked and the storage administration team is notified at step 270. Additionally, if the storage administrator or hardware engineer failed to insert the proper passwords (key #1, key #2 or both) for three times, they will fail to unlock the cache port and insert the cache cable safely. Also, at step 240, the storage management team, monitoring & operation team can be notified and a datacenter security guard can be alerted to investigate in person for any abnormal activities.

Although, the software-based locking or unlocking is described as being performed using "keys," it should be understood that the software-based key can comprise any suitable type of cryptographic key, password, code, security token, certificate, one-time/dynamic password or other trusted digital secret. Utilizing combination keys comprising two secret components, e.g., key1 and key2, that collectively comprise the single complex password, can provide a higher level of security. However, in an embodiment, the combination key can be one password that is auto-generated by the control computing device 120 and used by both storage administrator and hardware engineer.

Another alternative way of using combination keys is to utilize one or more complex key generators configured to generate the combination passwords to be used by both the storage administrator and the hardware engineer, respectively. More specifically, in an embodiment, the security solution can include a combination of at least two complex keys—a system complex key (SCK) and a release complex key (RCK)—for authorized personnel to safely insert and remove one or more storage devices without corrupting or losing hosted data.

For instance, the control system 120, can comprise a system complex key generator arranged to generate a system complex key that is generated during set-up and re-useable with numerous components of the system 10. During an initial configuration of the storage system, the system complex key (SCK) can be generated by the system complex key generator using, for example, a symmetric-key algorithm or a public-key algorithm. The SCK can be stored in one or more of the storage system 10, computing device 30, devices such as cache boards 15A-15n, and in the database 180 of the security system 110. The control system 120 can further comprise a release complex key generator arranged to generate a release complex key (RCK) for the target storage device. The RCK can stored in one or more of the storage system 10, computing device 30, the target storage device's memory, and in the database 180. The control computing device can be configured to perform software-unlocking based on the matching of an SCK password received from the administrator (e.g., at step 215) and can be configured to release the target storage device from the storage system when a release complex key password is provisioned by the on-site engineer that matches the release complex key for the target storage device (e.g., at step 230).

In addition or alternatively, the system can be configured to generate one or more of the keys on-demand in connection with a particular storage command. For instance, when there is a request to replace a particular cache board, the storage administrator will execute a storage command to suspend read/write operations to the cache memory to avoid losing any data. The control computing device 120 can be configured to ask a first complex key generator to generate a complex key, using for example, RSA, or a token and the like. When the operations are suspended successfully, the control computing device generates an alert prompting the engineer to input the second part of the complex key. The Engineer can provision the second part of the key using a complex key generator (e.g., another key from RSA, a security token, and the like). If the second key is correct, the physical lock will be opened and the cache board can be removed.

In an embodiment, the control computing device 120 is preferably configured to unlock only one hardware part at a time. Thus, because only one cache board is unlocked at a time, steps of routine 200 (e.g., steps 210-235 or 260-270) must be repeated for each individual storage hardware part being removed. This can avoid removing healthy hardware parts.

The requirement for an administrator's command to unlock a particular identified cache board and verification of the first part of the security key serves to ensure that the storage management/administrator is aware of what will be done on which hardware components of the storage systems they are managing and supporting. Additionally, the unlocking of only one cache board at a time, namely, the cache board identified in the unlock command, is preferable to guarantee that the technician can only access the intended cache board. Verification of the second part of the combination key can ensure the hardware engineer is authorized to perform the task for the single hardware part. Additionally, because only one hardware part is unlocked at a time, the requirement for an administrator unlock command and the verification of the administrator and engineer's combination key is required for each cache board can ensure that the correct components are removed, one at a time, and in a particular order.

To recap, the aforementioned systems and methods for securing cache boards in an enterprise data storage system solve a number of technical problems mentioned previously and further noted below. Usually, applications have two physical cache boards connected to storage systems for redundancy purposes. If one of them is failed and the hardware engineer removes the healthy one by mistake instead of failed one, this will cause a major incident/outage with data loss or/and corruption. The foregoing systems and methods serve to ensure the engineer will remove the appropriate cache board during maintenance. Additionally, unauthorized hardware engineers or technicians who are working in a shared data centers can easily remove critical hardware parts including a cache board which is the core of enterprise storage systems. The foregoing systems and methods serve to prevent them from doing such exercise. Also, multiple entities will be informed if unauthorized hardware engineer try to perform such abnormal activity. Furthermore, unauthorized hardware engineers who are working in a shared data centers can misuse the free ports on cache boards. The foregoing systems and methods serve to ensure no one can connect any parts unless he is authorized and the storage team are aware by inserting the combination password. Moreover, enterprise storage systems usually have multiple cache boards are connected to storage systems. If one of them is failed, the system will depend on the other cache which might impact the performance and causing slowness and data corruption or loss because data on the cache memory will be lost. The foregoing systems and methods serve to ensure the application will utilize another existing cache by redistribute data flow among healthy ones.

Although the control computing device 120 of the security system 110 and the computing device 30 of the enterprise storage system 10 are shown and described as separate computing devices that each perform respective operations, the system 100 is not so limited. It should be understood that the devices can be realized in one or more devices and that one or more features or functions of the control computing device 120 can be implemented using the computing device 30 and vice versa.

Figure 3:
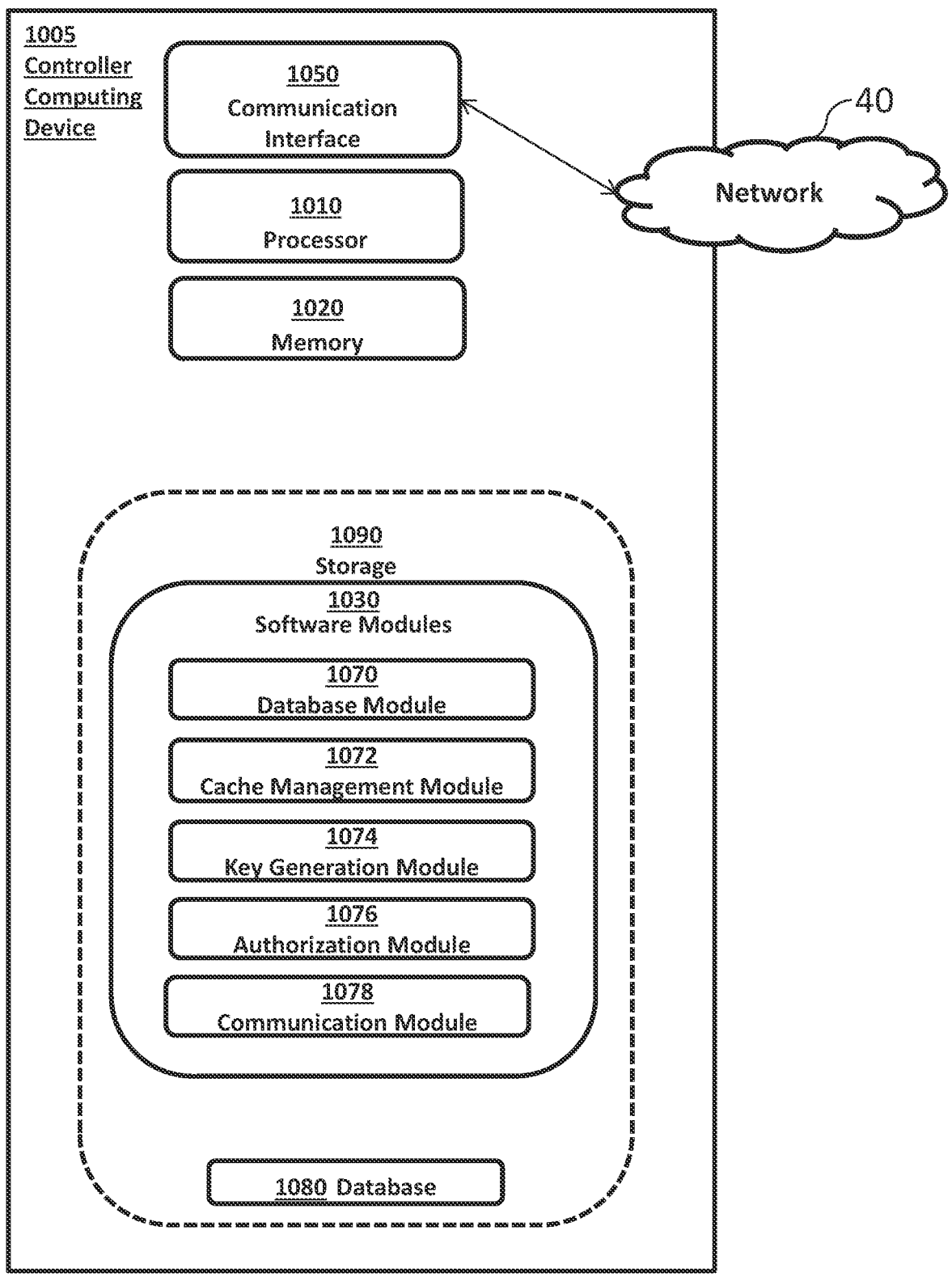
FIG. 3 is a block diagram of an exemplary computing device, according to an embodiment.

FIG. 3 is a block diagram of an exemplary configuration of a computing device that can be used in connection with the exemplary systems and methods for securing data storage devices of an IT network storage system, such as the control computing device 120 and/or the computing device 30 of system 100. The methods discussed above can be accomplished in whole or in part using the computing device 1005 shown in FIG. 3, as described in further detail below.

In a non-limiting example, the controller computing device 1005 can be arranged with various hardware and software components that serve to enable operation of the system (e.g., system 100), including a processor 1010, a memory 1020, a communication interface 1050 and a computer readable storage medium 1090. The processor 1010 serves to execute software instructions that can be loaded into the memory 1020. The processor 1010 can be a number of processors, a multi-processor core, or some other type of processor, depending on the particular implementation.

Preferably, the memory 1020 and/or the storage 1090 are accessible by the processor 1010, thereby enabling the processor 1010 to receive and execute instructions stored on the memory 1020 and/or on the storage 1090. The memory 1020 can be, for example, a random access memory (RAM) or any other suitable volatile or non-volatile computer readable storage medium. In addition, the memory 1020 can be fixed or removable. The storage 1090 can take various forms, depending on the particular implementation. For example, the storage 1090 can contain one or more components or devices such as a hard drive, a flash memory, a rewritable optical disk, a rewritable magnetic tape, or some combination of the above. The storage 1090 also can be fixed or removable or remote such as cloud-based data storage systems.

Any number of computer resources can be stored in the storage 1090, including, for example, a program module, an operating system (not shown), one or more application programs (not shown), or program data (not shown). Any (or all) of the operating system, application programs, program modules, and program data can be cached in the memory as executable sections of computer code.

One or more software modules 1030 are encoded in the storage 1090 and/or in the memory 1020. The software modules 1030 can comprise one or more software programs or applications having computer program code or a set of instructions executed in the processor 1010. Such computer program code or instructions for carrying out operations and implementing aspects of the systems and methods disclosed herein can be written in any combination of one or more programming languages. The program code can execute entirely on controller computing device, as a stand-alone software package, partly on the controller computing device and partly on a remote computer/device or entirely on such remote computers/devices. In the latter scenario, the remote computer systems can be connected to controller computing device through any type of network, including a local area network (LAN) or a wide area network (WAN), or the connection can be made through an external computer (for example, through the Internet using an Internet Service Provider).

Preferably, included among the software modules 1030 are a database module 1070, a cache management module 1072, a key generation module 1074, an authorization module 1076, and a communication module 1078, that are executed by processor 1010. During execution of the software modules 1030, the processor 1010 is configured to perform various operations relating to the systems and methods for securing data storage devices of an IT network storage system. More specifically, the cache management module 1072 configures the processor to perform various steps for managing operation of the cache boards and the storage system 10 that are described above as being performed by the control computer 120 or the control computer 30. The key generation module 1074 configures the processor to perform the various key generation and provisioning operations described above as being performed the control computer 120. Authorization module 1076 configures the processor to perform the user authorization and key-based validation/verification of users and requested operations described above as being performed the control computer 120. Communication module 1078 configures the processor to communicate with various computer devices of the system 100 including, for example, computer terminals 130A, 130B, computing device 30, the electronic locks 115A-115n, and the like. Database module 1070 configures the processor to perform various data storage operations including storing keys, user information and permissions, storage system parameters, and any information relating to operation of the systems and methods of the present disclosure.

A database 1080 can also be stored on the storage 1090. Database 1080 can contain and/or maintain various data items and elements that are utilized throughout the various operations of the system including keys, user information and permissions, storage system parameters, and other such information relating to operation of the systems and methods of the present disclosure.

It should be noted that although database 1080 is depicted as being configured locally to the storage of the controller computing device, in certain implementations, database 1080 and/or various of the data elements stored therein can be located remotely (such as on a remote server—not shown) and connected to the controller computing device through a network in a manner known to those of ordinary skill in the art.

A communication interface 1050 is also operatively connected to the processor 1010 and can be any interface that enables communication between the controller computing device and external devices, machines and/or elements such as an enterprise network data storage system 10 and its components. Preferably, the communication interface 1050 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting controller computing device to other computing devices and/or communication networks, such as private networks and the Internet. Such connections can include a wired connection or a wireless connection (e.g., using the IEEE 802.11 standard) though it should be understood that communication interface 1050 can be practically any interface that enables communication to/from the controller computing device.

At this juncture, it should be noted that although much of the foregoing description has been directed to systems and methods for securing data storage devices of an IT network storage system, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Descriptions of well-known components and processing techniques can be omitted so as to not unnecessarily obscure the embodiments of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Thus, illustrative embodiments and arrangements of the present systems and methods provide a system, processes and computer implemented control methods, computer system, and computer program product for securing data storage devices of an IT network storage system. The flowchart and block diagrams in the figures illustrate the architecture, functionality, and operation of possible implementations of systems, methods and computer program products according to various embodiments and arrangements. In this regard, each block in a flowchart or block diagrams as it relates to a computer implemented method can represent a module, segment, or portion of code, which comprises one or more executable instructions for implementing the specified logical function(s).

It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A system for securing data storage devices in an information technology (IT) network storage system, the IT network storage system including, a plurality of data storage devices mounted in slots in a cabinet and being in data communication with a computing device of the IT network, the system comprising:
   electronic locks, each electronic lock being mounted in the cabinet in physical relation to a respective slot among the slots and being configured to be transitioned between a locked state and an unlocked state, wherein in the locked state a respective electronic lock among the electronic locks physically prevents insertion or removal of a data storage device from a respective slot, and wherein in the unlocked state the respective electronic lock allows insertion or removal of the data storage device from the respective slot;
   a security controller computing device including: a processor, a communication interface, a non-transitory computer readable storage medium, and one or more software modules stored in the non-transitory computer readable storage medium and executable by the processor, wherein the processor is in data communication with the electronic locks, and wherein the one or more software modules include:
      a software-key generation module that configures the processor to generate one or more keys including a first key that is provisioned for an administrator of the IT network storage system and a second key that is provisioned for an engineer of the IT network storage system,
      a communication module that configures the processor to be in data communication with the electronic locks, a computing device of the IT network storage system, an on-site computing terminal at the location of the cabinet that is useable by the engineer, and an administrator computing terminal that is useable by the administrator, wherein the communication module configures the processor to receive a command that is input via the administrator computing terminal, wherein the command includes an identification of a particular data storage device among the data storage devices and is accompanied by the first key and wherein the command comprises one or more of a lock command or an unlock command,
      an authorization module that configures the processor to, in response to receiving the command and the first key, verify the first key,
      a cache management module that configures the processor to, in response to the unlock command and verification of the first key, initiate a software-based unlocking operation on the particular data storage device,
      wherein the communication module further configures the processor to receive the second key from the on-site terminal,
      wherein the authorization module further configures the processor to, verify the second key in regard to the first key, and
      wherein the processor is further configured to, after completion of the software-based unlocking operation on the particular data storage device and verification of the second key, transition a particular electronic lock among the electronic locks that is mounted to the cabinet and corresponds to the particular data storage device to the unlocked state.

2. The system of claim 1, wherein the software-based unlocking operation on the particular data storage device includes one or more of: suspending read and write operations to the particular data storage device, flushing data from the particular data storage device, and redistributing data flow to another data storage device among the data storage devices.

3. The system of claim 1, wherein the authorization module configures the processor to unlock only one of the electronic locks at a time.

4. The system of claim 1, wherein, in response to the lock command identifying the particular data storage device, verification of the first key and verification of the second key, the processor is configured to transition the particular electronic lock to the locked state.

5. The system of claim 1, wherein the data storage devices comprise cache boards.

6. The system of claim 1, wherein the first key and the second keys are combination keys, and wherein the processor is configured to verify the second key in regard to the first key by matching the first key with the second key.

7. The system of claim 1, wherein the processor is further configured to, in response to verification of the first key, transmit a request to the on-site terminal prompting the input of the second key via the on-site terminal.

8. The system of claim 1, wherein the key generation module configures the processor to store the one or more keys in association with the particular storage device, and wherein the authorization module configures the processor to verify the first key with regard to the identification of the particular storage device in the unlock command.

9. A computer implemented method for securing data storage devices in an information technology (IT) network storage system, the IT network storage system including, a plurality of data storage devices mounted in slots in a cabinet and being in data communication with a computing device of the IT network, the method comprising the steps of:
   providing electronic locks, each electronic lock being mounted in the cabinet in physical relation to a respective slot among the slots and being configured to be transitioned between a locked state and an unlocked state, wherein in the locked state an electronic lock physically prevents insertion or removal of a data storage device from a respective slot, and wherein in the unlocked state the electronic lock allows insertion or removal of the data storage device from the respective slot;
   generating, with a processor of a controller computing device, one or more software-based keys including a first key that is provisioned for an administrator of the IT network storage system and a second key that is provisioned for an engineer of the IT network storage system, wherein the processor is executing program code that is in the form of one or more software modules and stored in a non-transitory storage medium, and wherein the processor is in data communication with the electronic locks, a computing device of the IT network storage system, an on-site computing terminal at the location of the cabinet that is useable by the engineer, and an administrator computing terminal that is useable by the administrator;
   receiving, by the processor, a command input via the administrator computing terminal, wherein the command includes an identification of a particular data storage device among the data storage devices and is accompanied by the first key and wherein the command comprises one or more of a lock command or an unlock command;

verifying, by the processor in response to receiving the command and the first key, the first key;

initiating, by the processor, in response to the unlock command and verification of the first key, a software-based unlocking operation on the particular data storage device, receiving, by the processor, the second key from the on-site terminal, verifying, by the processor, the second key in regard to the first key, and in response to completion of the software-based unlocking operation on the particular data storage device and verification of the second key, transitioning, by the processor, a particular electronic lock among the electronic locks that is mounted to the cabinet and corresponds to the particular data storage device to the unlocked state.

10. The method of claim 9, wherein the software-based unlocking operation includes one or more of: suspending read and write operations to the particular data storage device, flushing data from the particular data storage device, and redistributing data flow to another data storage device among the data storage devices.

11. The method of claim 9, wherein the processor unlocks only one of the electronic locks at a time.

12. The method of claim 9, further comprising: in response to the lock command identifying the particular data storage device, verification of the first key and verification of the second key, transitioning the particular electronic lock to the locked state.

13. The method of claim 9, wherein the data storage devices comprise cache boards.

14. The method of claim 9, wherein the first key and the second keys are combination keys, and wherein verification of the second key in regard to the first key comprises matching the first key with the second key.

15. The method of claim 9, further comprising: in response to verification of the first key, transmitting, by the processor, a request to the on-site terminal prompting the input of the second key via the on-site terminal.

16. The method of claim 9, wherein the one or more keys are stored in association with the particular storage device, and wherein verifying the first key is performed in regard to the identification of the particular storage device in the command.

* * * * *